(12) United States Patent
Westhues et al.

(10) Patent No.: US 8,599,165 B2
(45) Date of Patent: Dec. 3, 2013

(54) FORCE AND TRUE CAPACITIVE TOUCH MEASUREMENT TECHNIQUES FOR CAPACITIVE TOUCH SENSORS

(75) Inventors: Jonathan Westhues, New York, NY (US); Jefferson Y. Han, Holliswood, NY (US)

(73) Assignee: Perceptive Pixel Inc., New York, NY (US)

( * ) Notice: Subject to any disclaimer, the term of this patent is extended or adjusted under 35 U.S.C. 154(b) by 237 days.

(21) Appl. No.: 12/857,024

(22) Filed: Aug. 16, 2010

(65) Prior Publication Data

US 2012/0038583 A1 Feb. 16, 2012

(51) Int. Cl.
*G06F 3/045* (2006.01)
*G09G 3/36* (2006.01)

(52) U.S. Cl.
USPC ............................................. 345/174; 345/87

(58) Field of Classification Search
USPC ..................... 345/170, 173, 174; 178/18.06
See application file for complete search history.

(56) References Cited

U.S. PATENT DOCUMENTS

| | | | |
|---|---|---|---|
| 4,672,154 A | 6/1987 | Rodgers et al. | |
| 5,606,346 A | 2/1997 | Kai et al. | |
| 6,002,389 A | 12/1999 | Kasser | |
| 2002/0185981 A1 | 12/2002 | Dietz et al. | |
| 2002/0185999 A1 | 12/2002 | Tajima et al. | |
| 2003/0063073 A1 | 4/2003 | Geaghan et al. | |
| 2006/0161870 A1 | 7/2006 | Hotelling et al. | |
| 2006/0161871 A1 | 7/2006 | Hotelling et al. | |
| 2009/0009483 A1* | 1/2009 | Hotelling et al. | 345/173 |
| 2009/0127005 A1 | 5/2009 | Zachut et al. | |
| 2009/0135148 A1 | 5/2009 | Bytheway | |
| 2009/0244029 A1 | 10/2009 | Huang et al. | |
| 2009/0284495 A1* | 11/2009 | Geaghan et al. | 345/174 |
| 2010/0026664 A1 | 2/2010 | Geaghan | |
| 2010/0060593 A1 | 3/2010 | Krah | |
| 2010/0073325 A1 | 3/2010 | Yang | |
| 2010/0085326 A1 | 4/2010 | Anno | |
| 2010/0107099 A1 | 4/2010 | Frazier et al. | |
| 2010/0144391 A1 | 6/2010 | Chang et al. | |
| 2010/0156805 A1 | 6/2010 | Brand et al. | |
| 2010/0201650 A1* | 8/2010 | Son | 345/174 |

FOREIGN PATENT DOCUMENTS

| | | |
|---|---|---|
| EP | 1956469 A2 | 8/2008 |
| EP | 2024974 A2 | 4/2009 |
| GB | 2428094 A | 1/2007 |
| WO | WO9718528 A1 | 5/1997 |

OTHER PUBLICATIONS

Uchimura et al., "Oversampling A-to-D and D-to A Converters with Multistage Noise Shaping Modulators," IEEE Transactions on Acoustics, Speech, and Signal Processing, vol. 36, No. 12, Dec. 1, 1988, 10 pages.

(Continued)

*Primary Examiner* — Michael Faragalla
(74) *Attorney, Agent, or Firm* — Alleman Hall McCoy Russell & Tuttle LLP

(57) ABSTRACT

Methods, systems, and apparatus relate to touch sensors that are configured to measure a true capacitive touch and a force applied to the sensor from a user. Some implementations involve the measurement of force and true capacitive touch simultaneously in a touch capacitive sensor.

38 Claims, 8 Drawing Sheets

(56) References Cited

OTHER PUBLICATIONS

Notification of Transmittal of International Search Report and the Written Opinion of the International Searching Authority, or the Declaration dated Jan. 6, 2012 from International Application No. PCT/US2011/043935, 13 pages.

Notification of Transmittal of International Search Report and the Written Opinion of the International Searching Authority, or the Declaration dated Dec. 21, 2011 from International Application No. PCT/US2011/043936, 16 pages.

Invitation to Pay Additional Fees and, where Applicable, Protest Fee, including Communication Relating to the Results of the Partial International Search dated Dec. 20, 2011 from International Application No. PCT/US2011/043937, 9 pages.

Invitation to Pay Additional Fees and, where Applicable, Protest Fee, including Communication Relating to the Results of the Partial International Search dated Dec. 22, 2011 from International Application No. PCT/US2011/047844. 9 pages.

Notification of Transmittal of International Search Report and the Written Opinion of the International Searching Authority, or the Declaration dated Mar. 6, 2012 from International Application No. PCT/2011/043937, 19 pages.

Notification of Transmittal of International Search Report and the Written Opinion of the International Searching Authority, or the Declaration dated Mar. 6, 2012 from International Application No. PCT/2011/047844, 24 pages.

Notification of Transmittal of International Search Report and the Written Opinion of the International Searching Authority, or the Declaration dated May 15, 2012 from International Application No. PCT/2012/023915, 15 pages.

DiamondTouch by Circle Twelve, downloaded from the internet on Aug. 27, 2010, at http://circletwelve.com/products/howitworks.html , 2 pages.

* cited by examiner

FORCE AND TRUE CAPACITIVE TOUCH MEASUREMENT TECHNIQUES FOR CAPACITIVE TOUCH SENSORS

TECHNICAL FIELD

This disclosure relates to techniques for measuring capacitance in capacitive touch sensors, for example, in the measurement of force and true capacitive touch simultaneously in a sensor.

BACKGROUND

Touch sensors, such as those are used in touch screens for portable devices and for monitors, are configured to detect changes in capacitance to generate electrical signals based on the detected changes, and to send the generated electrical signals to a receiver for further processing.

SUMMARY

This specification describes technologies generally relating to touch sensors that are configured to measure a true capacitive touch and/or a force applied to the sensor from a user.

In general, some aspects of the subject matter described in this specification can be embodied in methods that involve a sensor. Other embodiments of this aspect include corresponding systems, apparatus, and computer programs, configured to perform the actions of the methods, encoded on computer storage devices.

In general, another aspect of the subject matter described in this specification can be embodied in methods that include the actions related to a capacitive touch sensor. The sensor includes a first array (e.g., repetitive line patterns or an orderly arrangement of lines) of conductors arranged in rows, where the conductors in the first array are arranged substantially in parallel with one another. The sensor includes a second array of conductors arranged in columns, where columns of conductors in the second array are arranged substantially in parallel with one another. The columns of conductors in the second array are located underneath the first array of conductors, and the conductors in the second array are arranged in a direction that is substantially perpendicular to a direction of rows of conductors in the first array. The sensor includes a sheet having a dielectric material, where the sheet is located underneath the second array of conductors. The sensor includes a ground plane located underneath the sheet. The first and second arrays are configured to produce an electric field with electric field lines that extend in a first direction towards a user of the sensor and in a second direction towards the ground plane.

These and other embodiments can each optionally include one or more of the following features. A width of the conductors measured across a single row in the first array can be less than a distance of separation measured between adjacent edges of two adjacent rows of the first array, and a width of the conductors measured across a single column in the second array can be less than a distance of separation measured between adjacent edges of two adjacent columns in the second array. The ground plane can be positioned at least to partially terminate some of the electric field lines extending in the second direction. The sensor can be configured to detect an interruption in the electric field lines in the first direction. The sensor can be configured to detect the interruption of the electric field lines resulting from an object that is placed within a proximity of the sensor within the electric field lines of the first direction. The object can be a finger or some other body part of a user of the sensor. The sensor can include transmitters and receivers. The sensor can be configured to perform the following operations: transmit, with the transmitters, signals at least at two different frequencies on the first or second array of conductors; receive, with the receivers, the signals at least at the two different frequencies on the other of the first or second array of conductors; estimate a capacitance value at each of the two different frequencies using the received signals; determine that the object is the finger or some other body part of the user if the estimated capacitance values at the two frequencies differ by a factor of two or more; and determine that the object is not an object capable of generating a true capacitive touch signal (e.g., a finger or some other human body part) and an actuation of the sensor is due to measured force if the estimated capacitance values at the two frequencies do not differ by the factor of two or more. The sensor can be configured to receive an external force from touching or depressing the sensor. The sensor can be configured to compress at least the conductors in the first and second arrays toward the ground plane upon receiving the external force, and the sensor also can be configured to decrease a capacitance of the sensor when the external force is applied to the sensor. The sensor can include a capacitance characteristic where a level of measured capacitance decreases monotonically from when an object is placed within proximity of the sensor to when the object touches and depresses the sensor. The ground plane can include a sheet of indium tin oxide (ITO) or a transparent conductor. The ground plane can include wires or metal formed on a liquid crystal display (LCD). The sensor can be configured such that either one of the ground plane or a second sheet of material is formed underneath the sheet having the dielectric material, where the second sheet of material includes a dielectric constant that is higher than that of the deformable dielectric material. The sensor can be configured such that either the ground plane can be formed underneath the sheet having the deformable dielectric material or a second sheet of material can be formed above the sheet having the deformable dielectric material, for which the second sheet of material can have a dielectric constant that is higher than the sheet of the deformable dielectric material. The sensor can include indium tin oxide (ITO) on a polyester sheet (PET). The sensor can have opaque metal traces on a polyester sheet (PET) or a plastic substance. The conductors can include a transparent conductive material arranged in a pattern to produce a fringing electric field between the first and second array of conductors. The rows and columns can include diamond-shaped patterns at nonintersecting locations of the conductors of the first and second arrays. The conductors in the second array can be positioned between the first array of conductors and the deformable dielectric, and the deformable dielectric can be positioned between the conductors in the second array and the ground plane.

In general, another aspect of the subject matter described in this specification can be embodied in methods that include the actions related to a capacitive touch sensor. The sensor includes a first array of conductors arranged in rows, where the rows of conductors in the first array are arranged substantially in parallel with one another, and a width of the conductors measured across a single row in the first array is less than a distance of separation between respective conductors measured between adjacent edges of two adjacent rows of the first array. The sensor includes a second array of conductors arranged in columns, where the columns of conductors in the second array are arranged substantially in parallel with one another, and where the conductors in the second array are located underneath the conductors in the first array. The conductors in the second array are arranged in a direction that is substantially perpendicular to a direction of first array of conductors, and a width of the conductors measured across a single column in the second array is greater than a distance of separation between respective conductors measured between adjacent edges of two adjacent columns in the second array. The sensor includes a sheet having a dielectric material, where the sheet is located underneath the second array of conductors. The sensor includes a third array of conductors arranged in rows, where the rows of conductors in the third array are arranged substantially in parallel with one another, and the conductors in the third array are located underneath the sheet. The rows of conductors in the third array are arranged in a direction that is substantially perpendicular to a direction of the columns of conductors in the second array and a width of the conductors measured across a single row of the third array is greater than a distance of separation between respective conductors measured between adjacent edges of two adjacent rows in the third array.

These and other embodiments can each optionally include one or more of the following features. The sensor can include a force-sensitive sensor and a true capacitive touch sensor, where the true capacitive touch sensor can include the conductors of the first and second arrays, and the force-sensitive sensor can include the conductors of the second and third arrays and the sheet having the dielectric material. The force-sensitive sensor can be configured for a first measurement of a first capacitance for a parallel-plate capacitance between intersections of the conductors of the second and third arrays, and the true capacitive touch sensor can be configured for a second measurement of a second capacitance related to a fringing electric field between the first and second arrays of conductors. The sensor can be configured to detect if an object is within proximity of touching the sensor by the fringing electric field. The sensor can be further configured to detect if an object touches or applies a force to the sensor. The sensor can be configured to decrease a level of the second capacitance as the object moves closer to touching the sensor. The sensor can be configured to increase a level of the first capacitance as the object touches and applies the force to the sensor. The sensor can include indium tin oxide (ITO) on a polyester sheet (PET). The sensor can include opaque metal traces on a polyester sheet (PET) or a plastic substance. The conductors can include a transparent conductive material arranged in a pattern to produce a fringing electric field between the first and second array of conductors. The conductors in the second array can be positioned between the first array of conductors and the deformable dielectric, and the deformable dielectric can be positioned between the conductors in the second array and the third array of conductors.

In general, another aspect of the subject matter described in this specification can be embodied in methods that include the actions related a capacitive touch sensor. The sensor includes a first array of conductors arranged in rows, a second array of conductors arranged in columns that are substantially perpendicular to the rows of conductors in the first array, at least one transmitter coupled to the conductors within one of the first or second array of conductors, and at least one receiver coupled to the conductors within the other of the first or second array of conductors. A method for conducting measurements in the sensor involves transmitting, with the at least one transmitter, signals at least at two different frequencies that generate an electric field between at least one of the conductors in the first array and at least one of the conductors in the second array, for which the first and second arrays are configured to produce a fringing electric field that extends in a direction towards a user of the sensor and to enable detection of an interruption of the electric field resulting from an object that is placed within a proximity of the sensor. The method involves receiving, with the at least one receiver, the signals with the two or more different frequencies, estimating a capacitance value at each of the two or more different frequencies using the received signals, and determining if the estimated capacitance value at each of the two or more frequencies differs by a factor of about two or more. The method involves computing a ratio between the estimated capacitance values, and comparing the ratio against a threshold, for which the threshold comprises a value that is approximately two. The method may also involve computing a difference between the estimated capacitance values, and comparing the difference against a threshold. The method involves determining whether the object is capable of generating a true capacitive touch signal (e.g., a finger or some other human body part) and whether an actuation of the sensor is due to measured force based on results of the comparison of the ratio or difference between the estimated capacitance values at the two or more frequencies.

These and other embodiments can each optionally include one or more of the following features. The method can involve determining that the object is a finger or some other human body part of a user of the touch sensor if the estimated capacitance values at the two frequencies differ by the factor of about two or more. The conductors in the first array can be arranged substantially in parallel with one another, and the conductors in the second array can be arranged substantially in parallel with one another. The conductors in the second array can be located underneath the conductors in the first array. A width of the conductors measured across a single row the first array can be less than a distance of separation between respective conductors measured between adjacent edges of two adjacent rows of the first array, and a width of the conductors measured across a single column the second array can be less than a distance of separation between respective conductors measured between adjacent edges of two adjacent columns in the second array. The sensor can include a sheet having a dielectric material, where the sheet can be located underneath the second array of conductors; and the sensor can include a ground plane located underneath the sheet. With regards to the frequencies, at least the two different frequencies can differ by a ratio of approximately four to one. The sensor can include a true capacitive touch sensor. The sensor can include a force-sensitive sensor and a true capacitive touch sensor, for which the true capacitive touch sensor can include the conductors in the first and second arrays, and the force-sensitive sensor can include the conductors in the second array, conductors in a third array and a sheet having a dielectric material. The conductors in the first array can be arranged substantially in parallel with one another. The width of the conductors measured across a single row in the first array can be less than a distance of separation between respective conductors measured between adjacent edges of two adjacent rows of the first array. The conductors in the second array can be arranged substantially in parallel with one another. The conductors in the second array can be located underneath the conductors of the first array. The width of the conductors measured across a single column in the second array can be greater than a distance of separation between respective conductors measured between adjacent edges of two adjacent columns in the second array. The sheet can be located underneath the conductors of the second array. The conductors of the third array can be arranged in rows, and the conductors in the third array can be arranged substantially in parallel with one another. The conductors in the third array can be located underneath the sheet. The conductors in the third array can be arranged in a direction that is substantially perpendicular to a direction of conductors in the second array, and a width of the conductors measured across a single row in the third array can be greater than a distance of separation between respective conductors measured between adjacent edges of two adjacent rows in the third array. The two different frequencies can include a first frequency and a second frequency, and the first frequency can be higher than the second frequency. The method also can include receiving signals for the second frequency at the at least one receiver that has a higher current than the signals received for the first frequency. The sensor can include indium tin oxide (ITO) on a polyester sheet (PET). The sensor can have opaque metal traces on a polyester sheet (PET) or a plastic substance. The conductors can have a transparent conductive material arranged in a pattern to produce a fringing electric field between the first and second array of conductors. The rows and columns can have diamond-shaped patterns at non-intersecting locations of the conductors of the first and second arrays.

The details of one or more embodiments of the subject matter described in this specification are set forth in the accompanying drawings and the description below. Other features and aspects of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
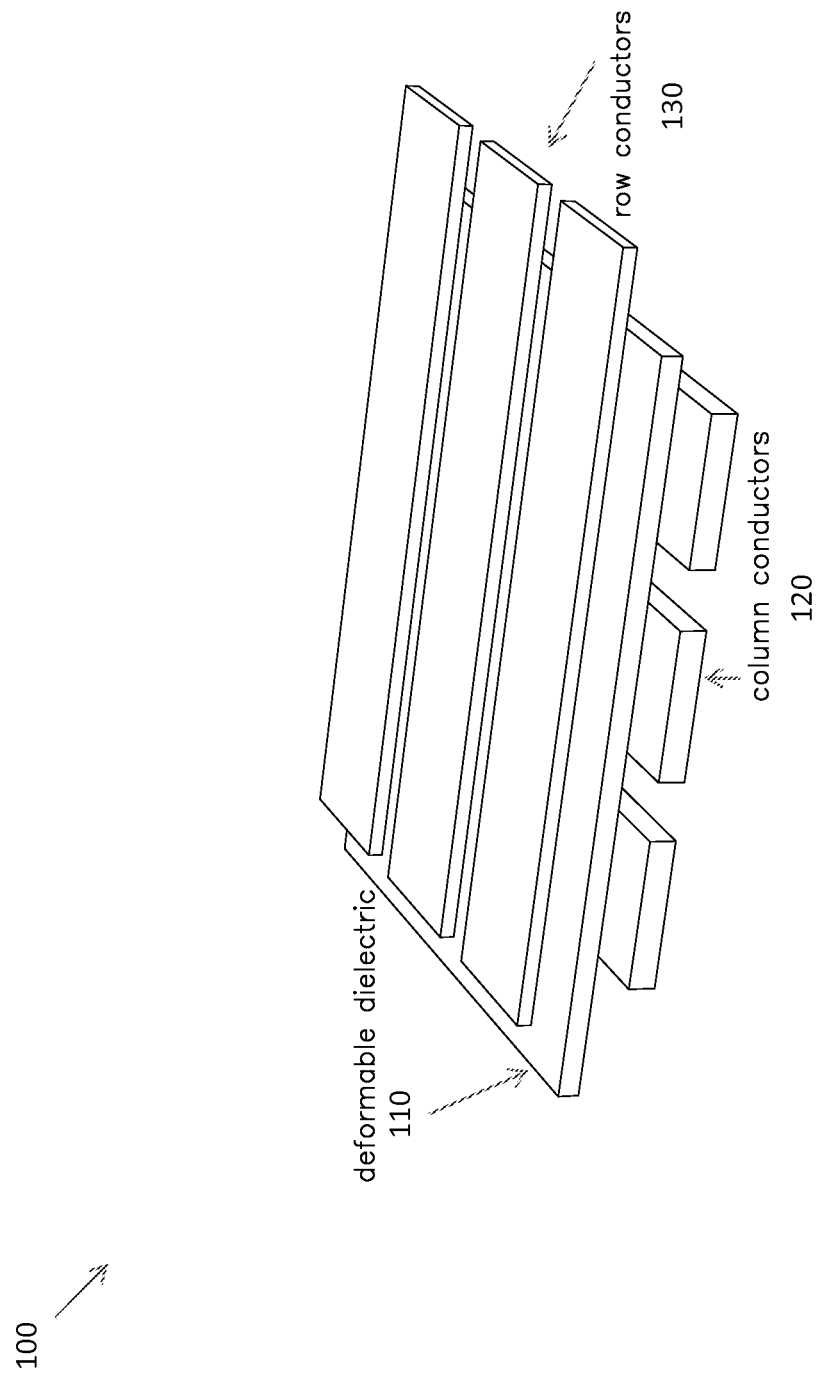
FIG. 1 depicts a diagram of an array of rows and columns for a touch sensor.

In a capacitive touch screen, sensors are made from electrically conductive rows and columns, where the rows and columns are movable to receive a force applied from a user of the sensor. The rows and columns cross over each other, approximately perpendicular, and form a two-dimensional matrix. The electronic controller for such a touch screen will measure the capacitance from each row to each column at each intersection, producing m*n measurements for a matrix with m rows and n columns. The capacitance is measured by applying a time-varying excitation voltage on each conductor (which we will assume here, arbitrarily, to be a column), and measuring the current coupled into each row. Multiple rows are measured in parallel, and the process is repeated serially for each column, or partially in parallel, with orthogonal excitation waveforms used on multiple columns. For example, orthogonal excitation waveforms may be used on the multiple columns, as described in U.S. patent application Ser. No. 12/838,419, filed Jul. 16, 2010, which is incorporated by reference in its entirety.

If the user's finger is moved close to one of the intersections, then the capacitance at that intersection will change. The user's finger is conductive, has dielectric constant different from that of air, and, to the extent that it is conductive, has some connection through the user's body to the controller circuit's ground node. Some combination of these effects will cause a change in the capacitance, which may decrease (as current flows from the transmitter into the user's body and to ground, instead of from the transmitter to the receiver) or increase (as current flows from the transmitter into the user's finger, and from the user's finger into the receiver; the user's finger is more conductive and has higher dielectric constant than air). The mode in which the user's finger causes a decrease in the capacitance occurs at higher frequencies, which allows for more total energy transferred in a given integration period, which allows for higher signal-to-noise ratio (SNR). The decreasing mode is therefore used whenever true capacitive touch is measured in this disclosure.

The "true capacitive touch" measurement is used because it has zero actuation force. It responds to the position of the user's touch, not the force, and therefore responds to even a very light touch. In some applications, however, an analog measurement of the user's touch force provides a useful additional degree of freedom.

For example, force may be mapped to capacitance by constructing a parallel-plate capacitor with a deformable dielectric between the plates. When a force is applied to the capacitor, the dielectric material deforms, and allows the plates to move closer together. This increases the measured capacitance. A matrix of such sensors can be constructed, for example with wide, overlapping rows and columns, and a dielectric material between the rows and columns. This matrix may be scanned in the same way as to measure true capacitive touch. The force-sensitive sensor designs also allow the device to be actuated with objects other than the finger, such as with a stylus instrument, e.g., a hard plastic rod. Anything that can be used to apply force (including, for example, a non-conductive plastic object) can be used for providing a signal corresponding to the force of the sensor. An example of such a sensor is reproduced as FIG. 1.

Within the array of rows and columns for touch sensor 100 shown within FIG. 1, the touch sensor 100 includes transparent, electrically conductive rows and columns. The touch sensor 100 has row conductors 130 formed over a deformable dielectric 110. The deformable dielectric 110 is formed atop column conductors 120. These conductors may be made from indium tin oxide (ITO), but other materials may also be used, such as silver nano-wires, or larger-scale metal wires that are slightly or largely opaque but small enough to be relatively inconspicuous. The illustrated configuration yields conductors arranged in a two-dimensional orthogonal matrix, for example, with row conductors being substantially parallel to an x-axis, and column conductors being substantially parallel to a y-axis.

Touch sensor 100 includes wide columns and wide rows that overlap, yielding a parallel-plate capacitance at the areas of the overlap between the rows and columns. In FIG. 1, the dielectric 110 is deformable, and the rows and columns are positioned on flexible pieces of indium tin oxide (ITO) on a polyester sheet, for example. When touch sensor 100 receives force applied by an external force, such as by a user's finger, dielectric 110 deforms and decreases the separation between the rows and columns in the depressed area, causing the measured capacitance increases in that area. The capacitance of the matrix of rows and columns can be read out to measure the capacitance at each of the m*n intersections, independently. In FIG. 1, the electric field is within the row and columns, so the sensor primarily responds to a force applied to the sensor. The force may include a physical depression in the sensor resulting from a touch from a user's finger or from some other conductive or non-conductive object, such as a stylus instrument or some other non-conductive object.

In another architecture, instead of measuring the capacitance from each row to each column, it is possible to measure the capacitance from each row or column to ground. In a system employing this design with m rows and n columns, m+n measurements are made, not m*n. In this case, the parallel plate capacitance would occur between the row or column and the ground plane, not between the row and the column. Adopting this architecture, a force that is applied at more than one point may generate a result that is not unique to the locations where the force is applied. For example, forces at positions (1, 2) and (3, 4) will generate increased capacitance on rows 1 and 3, and columns 2 and 4; but forces at positions (1, 4) and (3, 2) will also generate increased capacitance on those same rows and columns. Heuristic methods may be employed to thereafter attempt to resolve among competing potential source locations for the inspiring force, for example, by considering the sequence in which the points are touched. The m*n architectures discussed below, however, do not have to employ heuristic methods to resolve among competing potential source locations for the inspiring force. The features described below can offer m*n architectures that provide correct results when two points are touched almost simultaneously, or when points move so that they lie along a horizontal (parallel to the rows) or vertical (parallel to the columns) line.

Figure 2:
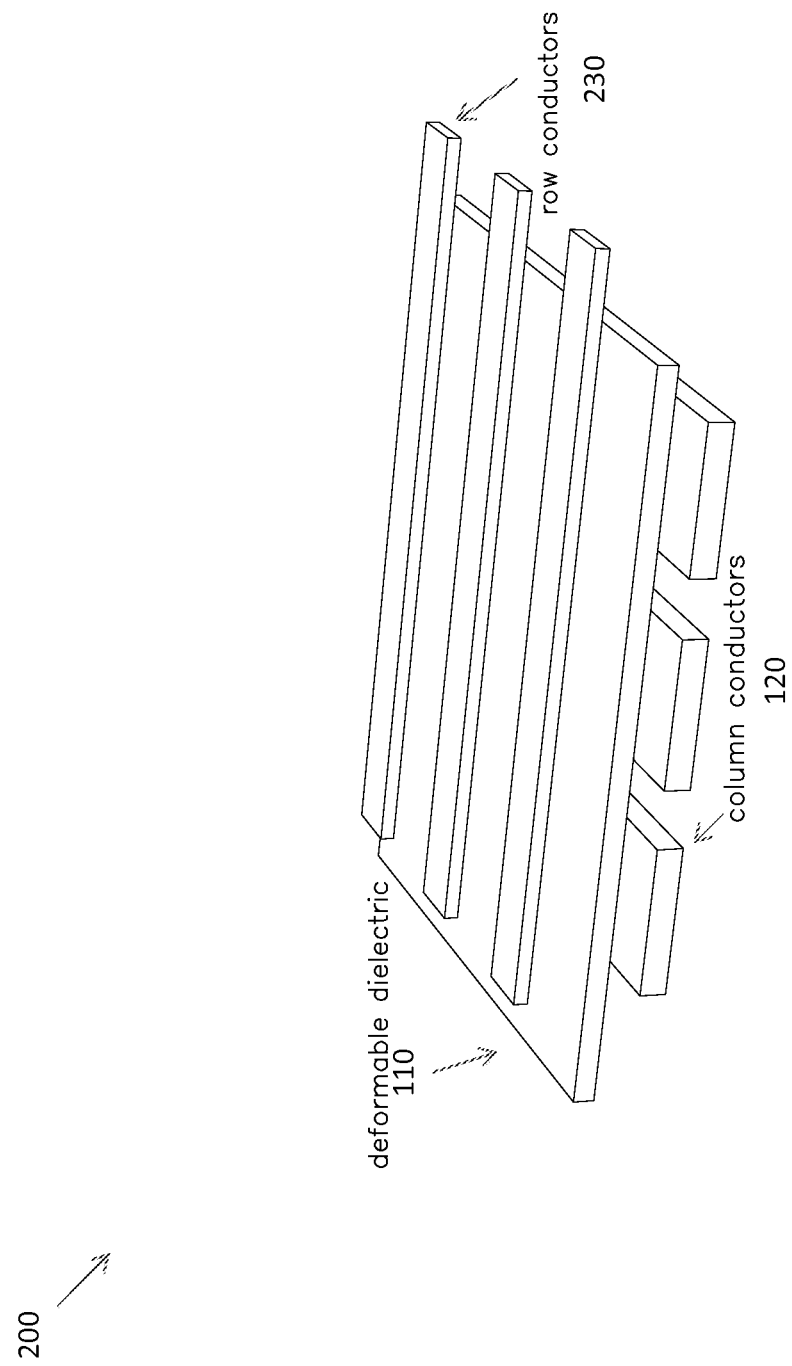
FIG. 2 depicts a diagram of another example of an array of rows and columns for a touch sensor.

In FIG. 2, touch sensor 200 is shown having an array of rows and columns. The touch sensor 200 has transparent, electrically conductive rows and columns. The touch sensor 200 has row conductors 230 positioned over a deformable dielectric 110. The deformable dielectric 110 is positioned above column conductors 120. For reasons described below, the touch sensor 200 of FIG. 2 has relatively narrow row conductors 230 with relatively wide spaces between each of the row conductors.

Figure 8:
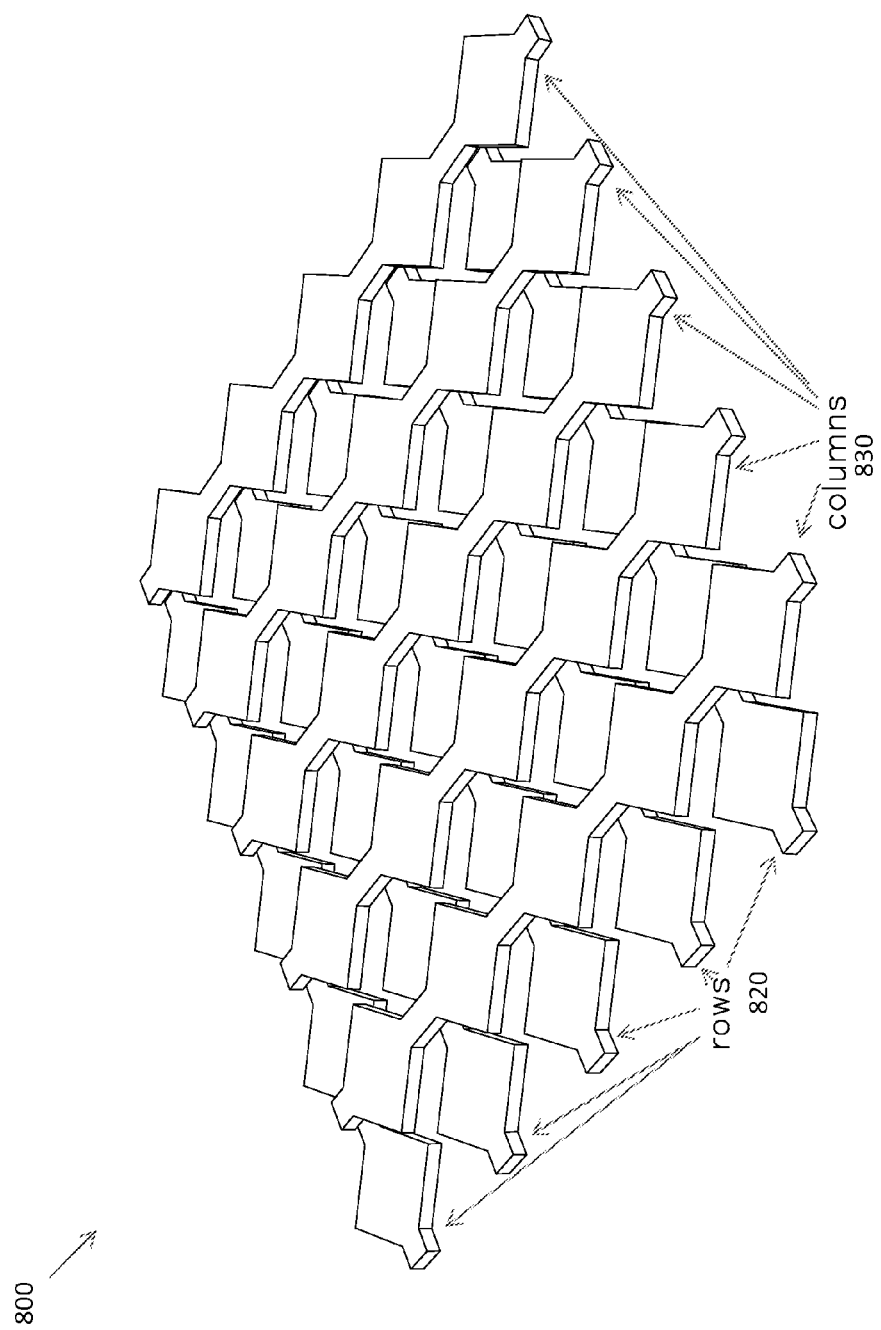
FIG. 8 depicts a diagram of an array of rows and columns for the touch sensor, where the rows and columns have a diamond pattern.

The FIG. 2 structure produces both the above-noted parallel-plate capacitance, and a fringing capacitance that may be interrupted by the user's finger. Such a structure measures both true capacitive touch, from the fringing field, and force, from the parallel-plate capacitance, as the material between the row and column deforms. Such a structure orients the top conductors in relatively sparse relative orientation, with space between them to allow the field to fringe up; an example of this structure appears as FIG. 2, but other structures are also contemplated with this property. For example, a diamond pattern 800, as shown in FIG. 8, may be configured to have this property, using the fringing field between the diamonds and the parallel-plate capacitance where the rows 820 and columns 830 cross over one another, or an interdigitated pattern.

In FIG. 2, the row conductors 230 are narrow instead of wide so that there is a large spacing between the row conductors 230 to reduce an amount of parallel plate capacitance between the row conductors 230 and the column conductors 120, and to allow a fringing field from the row conductors 230 to form so that a disruption of the fringing field can be detected by the sensor to provide for a fringing capacitance for a touch (non-force) signal. Other implementations may be configured like FIG. 2, for example, the diamond pattern 800 in FIG. 8 or interdigitated patterns.

As described, the touch sensor 200 of FIG. 2 can serve as both a "true capacitive touch sensor" and "a force-sensitive sensor," respectively, measuring changes to the fringing field and the electric field in the dielectric. For instance, as a force-sensitive sensor, touch sensor 200 operates similarly to the touch sensor 100 of FIG. 1, where a parallel-plate capacitance is measured resulting from a force applied to the touch sensor, providing an additional degree of freedom. For example, with a user's finger, an amount of force applied by the user for the touch can provide the additional degree of freedom, such as having a light touch to indicate one type of instruction and a harder touch to indicate another type of instruction. Force-sensitive sensor designs can also allow touch sensor 200 to be actuated with objects other than the finger, such as with a stylus instrument (e.g., a hard plastic rod, or any conductive or non-conductive object) for providing a signal corresponding to the force for the sensor. For applied force with a relatively small contact area, for example, the force may be measured entirely at one intersection in the matrix, and that measurement may be proportional to the force applied. For applied force with a relatively large contact area, for example, the force may be measured at multiple intersections in the matrix, and those measurements may be proportional to the integral of that force over the area of each particular intersection, and therefore to the applied pressure. In this disclosure, the terms for force and pressure may be used interchangeably. In some implementations, the signal produced by the force in the touch sensor may be an analog measurement of the user's touch force.

By contrast, and as earlier indicated, operating as a "true capacitive touch sensor," touch sensor 200 generates measurements despite the absence of force. In this sense, true capacitive touch is measured by the disruption in the electric field when a user's finger is brought into proximity with or interferes with the fringing field of the sensor. Thus, true capacitive touch signal is generated in the touch sensor 200, even if the user does not apply pressure to the sensor, since a measurable change in the capacitance can be determined when a user's finger is brought into proximity with the fringing field of the sensor. Since the user does not have to apply a force to actuate the sensor, there is no resulting frictional force if the user's finger moves within the plane of the sensor, and the user does not feel this undesirable frictional drag on the user's finger. Rather, the true capacitive touch sensor can respond to the position of the user's finger, not the force, and therefore can respond to even a very light touch from a user.

Figure 3:
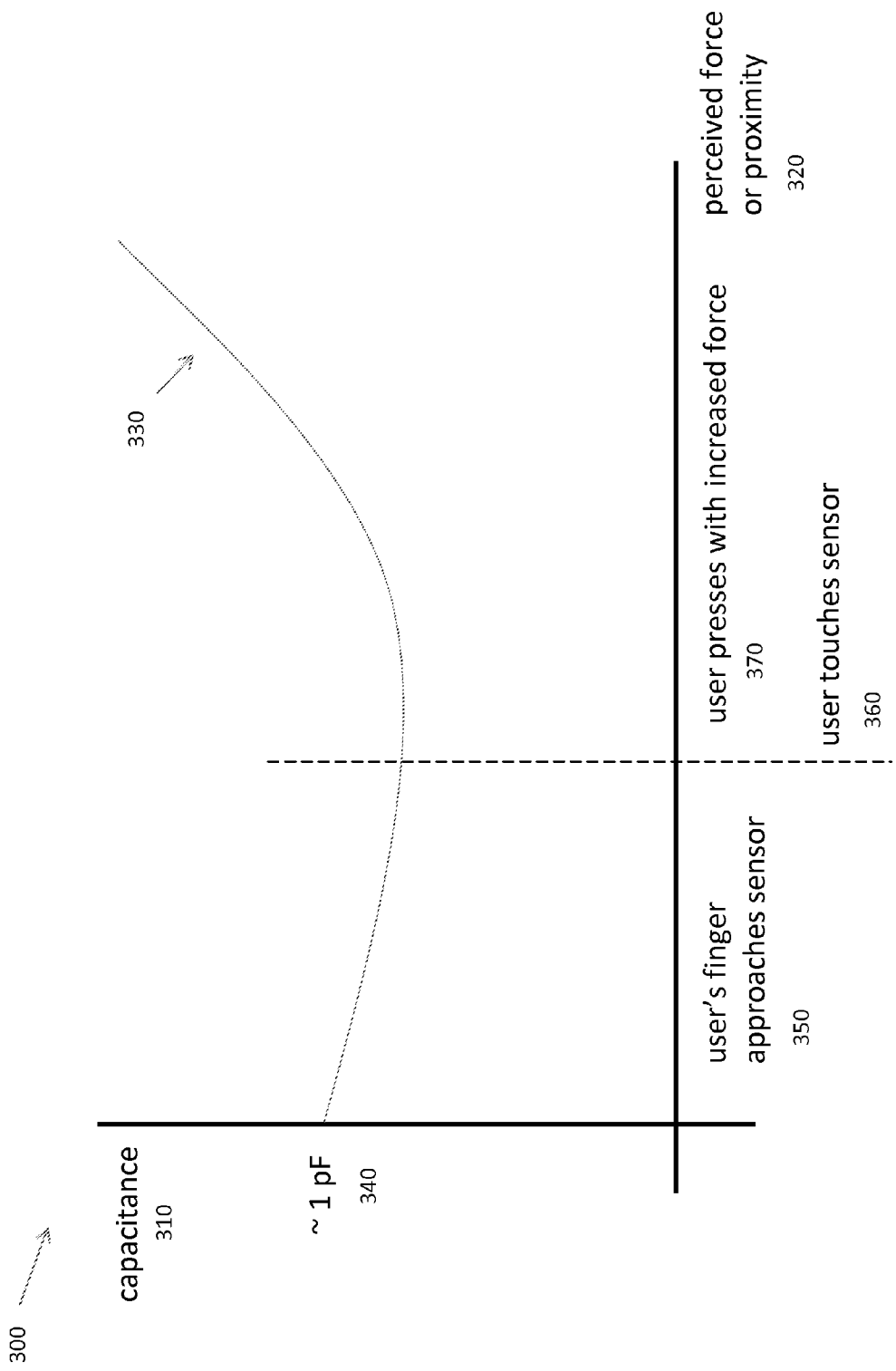
FIG. 3 depicts a diagram of a graph of measured capacitance versus a perceived touch force or proximity signal received by the touch sensor of FIG. 2.

In FIG. 3, measured capacitance 310 is related to a perceived touch force based on a corresponding proximity signal 320 received by the touch sensor 200 of FIG. 2. Specifically, as demonstrated by FIG. 3, as the user's finger approaches the touch sensor of 350, causing the measured capacitance 310 to progressively decrease as the user's finger will interrupt the fringing field from a row to a column. The capacitance due the fringing field is the dominant capacitance in this instance. After a point where the user's finger touches the sensor 360 and begins to apply an increasing force of 370, the capacitance increases as the parallel plate capacitance increasingly becomes the dominant capacitance. This represents a non-monotonic transfer function from measurements of the perceived touch force to capacitance. As a consequence of the non-monotonic transfer function depicted by FIG. 3, a user that touches and presses hard enough on the touch sensor may increase the measured parallel-plate capacitance to the point where that parallel-plate capacitance offsets a decrease in the measured capacitance corresponding to that user's interaction on the fringing capacitance effects, and yielding results that obfuscate whether the user touches or attempts to touch the sensor at all.

There may be other measurements performed in other implementations of touch sensors. For example, in some other implementations, the capacitance can be measured from each row and column to ground, instead of from each row to each column, thus making m+n measurements instead of m*n measurements. In this case, the parallel plate capacitance would occur between the row or column and the ground plane, not between the row and the column. Some of these touch sensor implementations employing the m+n measurements may not be able to determine each force independently (or their locations) when force is applied at more than one point, even with complex modeling and computations.

As earlier mentioned, when the user touches the capacitive touch sensor, at least two different effects are observed. First, some of the energy flowing out of the transmitter can flow into the user and return to ground through the user's stray capacitance to that node. This stray capacitance may occur, for example, if the user is holding the device's metal case, even through a non-conductive coating, or, failing that, through the user's finger, because the sensor pitch can be fine enough so that their finger can also be close to other elements in the matrix, for which some elements will be grounded. This first effect may decrease the total energy that flows to the receiver. Second, some of the energy flowing out of the transmitter can couple into the user's finger, through the user's flesh, and then out of the user's finger to the receiver. Because the dielectric constant of the user's finger, which is approximately the same as salt water, is larger than that of air, this can increase the coupling effect, and increase the received energy.

The two effects can produce different responses for the energy flow. For example, depending on which effect dominates, there may be a non-monotonic relationship between the measured signal and the distance from the user's finger to the sensor. With this in mind, to improve performance of the sensor, touch sensors can be configured to operate in either a strictly-increasing or a strictly-decreasing mode to have a monotonic relationship. The strictly-decreasing mode may work particularly well in some implementations because this mode may occur at higher frequencies. The effects corresponding to the strictly-decreasing mode may also occur with a greater separation between the user's finger and the touch sensor (since as the user's finger becomes very close to the sensor, the effect in which current couples from a transmitter, to the user's finger, and then through the user to a receiver dominates, and causes an increased capacitance). This can allow a larger thickness for the glass for the cover of the sensor. Some other implementations, however, may use the strictly-increasing mode. As described below, there may be other effects on the mode that are a function of frequency.

Figure 4:
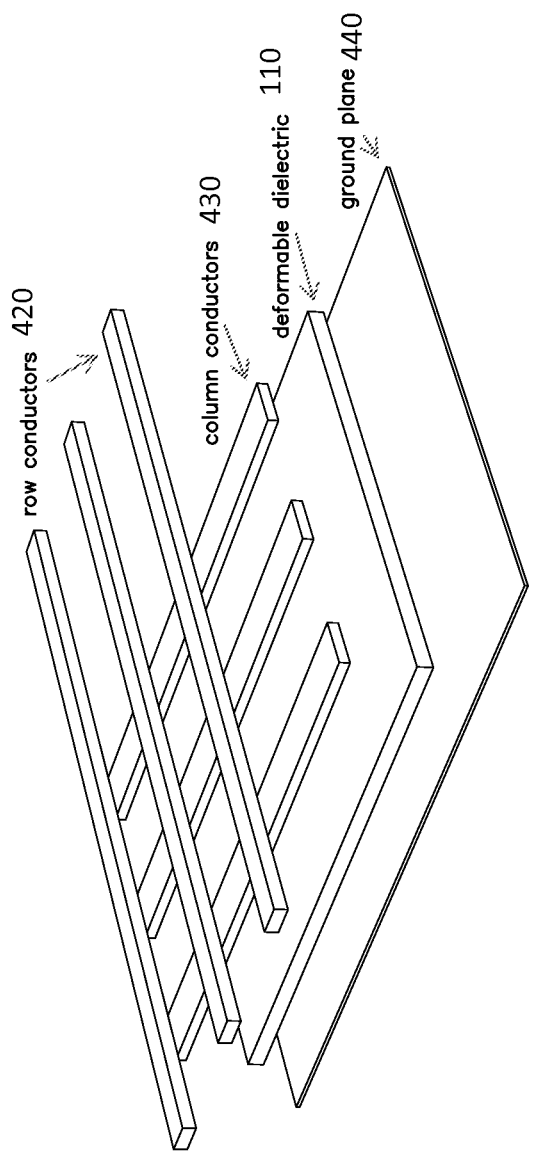
FIG. 4 depicts a diagram of an array of rows and columns for a touch sensor.

As illustrated through the example shown in FIG. 4, in some implementations, it is possible to arrange a sensor such that a first fringing capacitance is affected by force, and a second and different fringing capacitance can be affected by the user's finger. This arrangement can be accomplished using a pattern of electrodes that generates a significant fringing field on both the front (toward the user) and back (toward the display) sides of the sensor. A pattern with narrow wires can have this property, for example, as does a diamond 800 pattern (FIG. 8), or an interdigitated pattern, or others. The sensor can include a flexible material, for example, metal or transparent conductive (e.g., indium tin oxide, ITO) traces on polyester (PET) or other plastic film substrate. The sensor may be placed above a ground plane, separated by a deformable dielectric material.

In particular, in FIG. 4, there are narrow row conductors 420 and narrow column conductors 430 with wide spaces between each of the rows 420 and between each of the columns 430. The touch sensor 400 includes row conductors 420 above the column conductors 430. Below the column conductors 430 is a deformable dielectric 110 with a ground plane 440 underneath. The column conductors 430 are positioned between the row conductors 420 and the deformable dielectric 110, and the deformable dielectric 100 is positioned between the column conductors 430 and the ground plane 440. In terms of the perspective illustrated in FIG. 4, the row conductors 420 are considered to be on top of the other layers shown for the sensor, and the ground place 440 is considered to be underneath the other layers shown for the sensor. The dominant capacitance in FIG. 4 can be fringing capacitance between the respective rows 420 and columns 430. Since the rows 420 and columns 430 can be roughly coplanar (e.g., the separation between the rows and columns is relatively small), the fringing field can be roughly symmetric.

Figure 5:
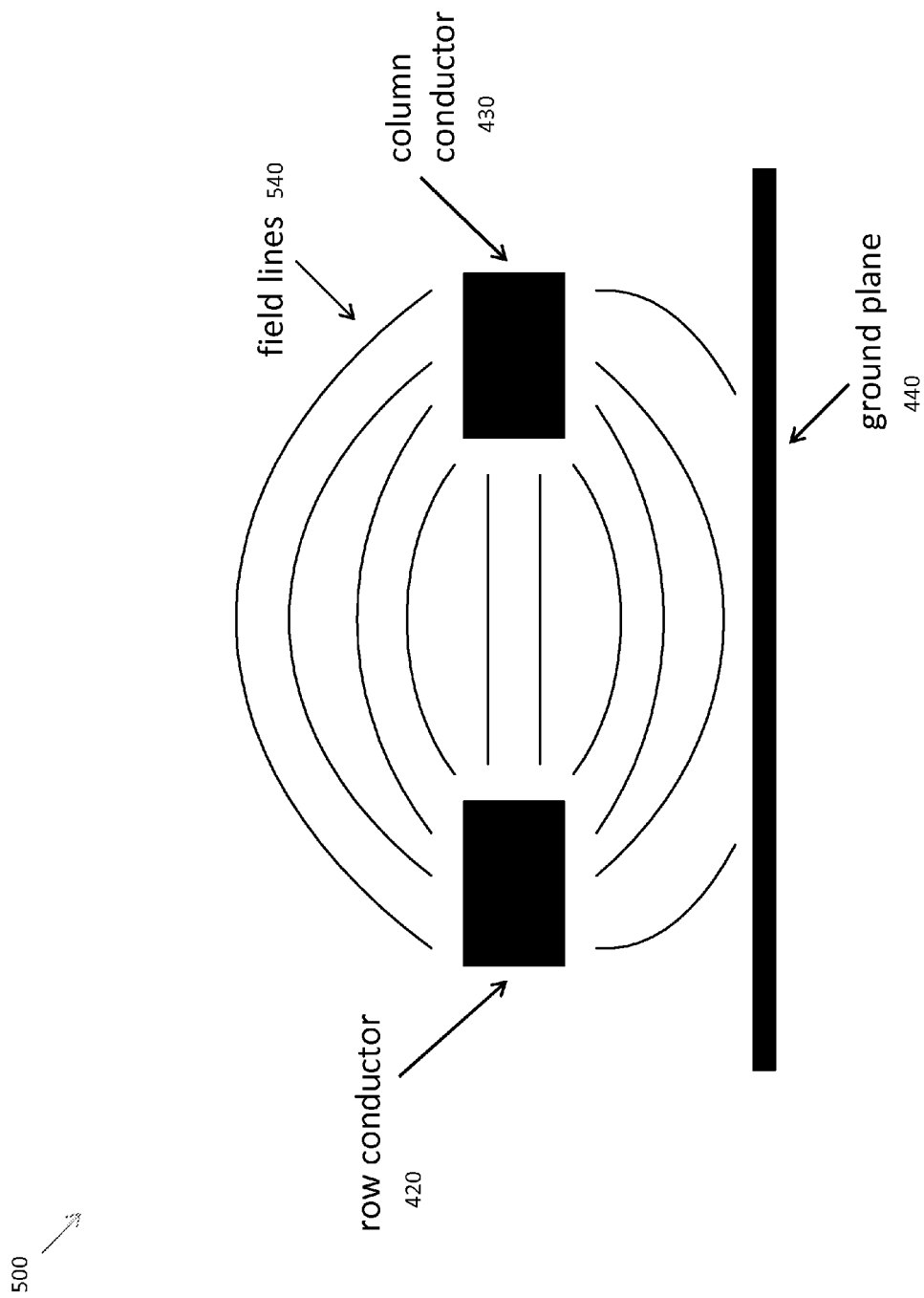
FIG. 5 depicts a diagram exemplifying fringing fields that exist around a row and a column of the touch sensor of FIG. 4.

FIG. 5 illustrates exemplary fringing field lines 540 around a row conductor 420 and a column conductor 430 of the touch sensor 400 of FIG. 4. In FIG. 5, the fringing field lines 540 can be symmetric on both sides of the row conductor 420 and column conductor 430, where on one side, fringing field lines 540 extend out from the touch sensor 400 toward a user, and on another side, fringing field lines 540 extend out away from the user (e.g., on a back side and/or towards a display). The fringing field on the front side of the touch sensor can be disrupted by the user's finger and provide a true capacitive touch signal, which tends to decrease the measured capacitance. The fringing field on the back side of the sensor can be utilized by the deformable dielectric 110 and a ground plane 440. If the touch sensor is pressed with a non-conductive object then the conductors 420, 430 are moved toward the ground plane 440, causing a fraction of the fringing field on that back side of the sensor to be shorted or at least partially terminated by the ground plane 440. The current flowing into the transmitter therefore flows, at least in part, into the ground plane 440, which decreases the measured capacitance slightly, relative to the capacitance measured if that ground plane was not present.

Figure 6:
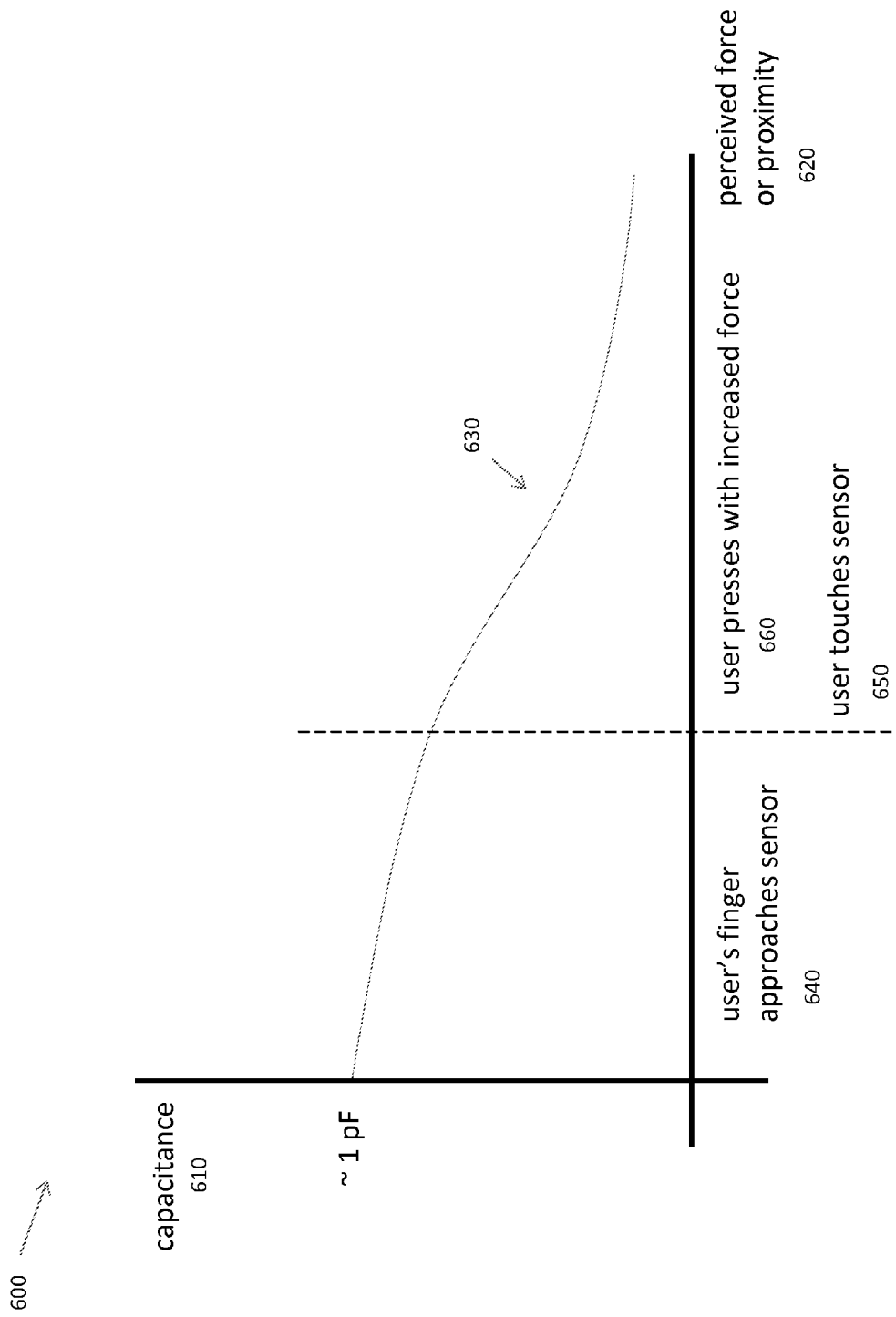
FIG. 6 depicts a diagram of a graph of measured capacitance versus a perceived touch force or proximity signal received by the sensor.

In FIG. 6, measured capacitance 610 is related to a perceived touch force based on a corresponding proximity signal 620 received by the touch sensor. As the user's finger approaches the touch sensor 640 the measured capacitance 630 decreases. As the user begins to touch the sensor 650 the capacitance decreases, and as the user's finger is applied with an increased force 660, the capacitance further decreases as the sensor moves close to the ground plane.

Specifically, if the user's finger presses very lightly, the capacitance decreases because the current that flows out of the transmitter of the sensor can flow at least partially through the user's finger to ground, based on the at least partial connection to circuit ground of the user, instead of flowing into the receiver of the sensor. If the user's finger presses with increased force, then the measured capacitance decreases further because the rows and columns of the sensor can move closer to the ground plane, which causes the separate but complimentary effect of having some of the current flow into the ground plane instead of the receiver.

The measurement of the capacitance illustrated by FIG. 6 is therefore monotonic with respect to the user's perceived touch force. The monotonic capacitance characteristic can allow a mapping of the function of the capacitance to a user's finger movement and/or a measurement of pressure.

Techniques employing frequency can be used to distinguish between the sensing of the capacitance resulting from the user's finger and the capacitance resulting from the force applied by some other object (e.g., a stylus instrument, a conductive or non-conductive object). For example, the capacitance with respect to a user's finger can vary with frequency, and the capacitance due to the field within the deformable dielectric can stay approximately constant with frequency. By assessing the capacitive measurements at different frequencies, a determination can be made as to whether the touch sensor is touched by the user's finger or the non-conductive object.

More particularly, in the case of a user's touch, there are a number of effects that can be utilized for making this distinction to determine the sensing of the capacitance resulting from the user's finger (as opposed to determining the capacitance resulting from the force applied by some other object, such as a stylus instrument). The measured capacitance change due to the user's finger may change dramatically (e.g., around a factor of two or more) with a change in frequency over a practical range. For example, one effect results from the impedance between the user and the controller circuit's ground node, which is not zero and at the frequencies of interest may be modeled as a capacitance. The user may also be capacitively-coupled to ground as a result of being in proximity of a grounded touch screen. The user can be grounded capacitively, for example, through a ~100 pF capacitance. In some situations, the capacitance can vary significantly, by a factor of at least three to one in either direction, depending, for example, on whether the user is standing in bare feet on a concrete floor above metal decking, or in thick-soled shoes on a floor made from plywood on dry wooden joists. To a first order, the user's coupling to ground can be modeled as a capacitance. So the user may be more effectively grounded at higher frequencies than at lower frequencies at least because capacitive impedances tend to decrease with increased frequency.

Moreover, at high frequencies, the user may be effectively grounded with the impedance due to the capacitance small at high frequencies allowing current to flow out of the transmitter of the touch sensor, through the user, and eventually to ground. Thus, a large decrease in capacitance can be observed when the user's finger approaches an intersection in the matrix, resulting in a relatively large decrease in the measured capacitance.

At lower frequencies, the user may not be so effectively grounded. If the user is less effectively grounded, then instead of the current flowing from the transmitter, through the user's finger, and to ground, some of the current can flow from the transmitter, through the user's finger and then back into the receiver, since this impedance path is lower than the impedance path to ground. Generally, this results in a relatively small increase in capacitance, which combines with the decreased capacitance described above, yielding a smaller net change. Since the dielectric constant of human flesh is roughly that of water, and thus greater than that of free space, this effect can, in some implementations, even cause the measured capacitance to increase when the user's finger is present, instead of decreasing.

Due to the effects, measurements can be performed at different excitation frequencies, with the user being relatively well grounded at high frequencies, yielding a smaller capacitance, and with the user not being well grounded at lower frequencies, yielding a larger capacitance.

For the force-sensitive sensor signal, the force-sensitive sensor capacitance relates more to the field within the dielectric of the sensor. The dielectric constant of the deformable dielectric may be taken into account in regards to frequency such that there may not be much of a change in the capacitance over frequency. The capacitance within the deformable dielectric can relatively ideal, changing by no more than a few percent over a reasonable range of frequency, for example from a frequency range of about 10 kHz to 1 MHz or more. In some implementations, the materials selected for the dielectric can have a permittivity that does not change over frequency by more than that amount. A side effect may be observed due to the resistance of the conductive traces, which in combination with the capacitances under test, forms a frequency-selective resistive-capacitive (RC) circuit, and changes the measured capacitance. If the trace resistance is known then this RC effect can be calculated and corrected.

Some techniques to distinguish between a true capacitive touch and a force signal can involve measuring the capacitances at two frequencies, such that if the measured capacitances at the two frequencies are quite different, then there can be an assumption that there was probably a finger touch, and if the measured capacitances at the two frequencies are quite close, then there can be an assumption that there was probably a force applied from an object (e.g., a stylus instrument). For example, a signal generated due to force can be distinguished from a signal generated due to a true capacitive touch, by scanning at two widely-separated frequencies (e.g., 30 kHz and 120 kHz) and noting that the former will not change by more than tens of a percent, and the latter will change dramatically, by a factor of 2 or more, for example. In some implementations, the two different frequencies can differ by a ratio of approximately 4:1.

In some implementations, any m*n (capacitance from a row to a column) capacitive force-sensitive sensor, where the capacitance is measured at multiple frequencies, can be used to distinguish true capacitive touch (due to the current through the user's finger) from the force signal.

Figure 7:
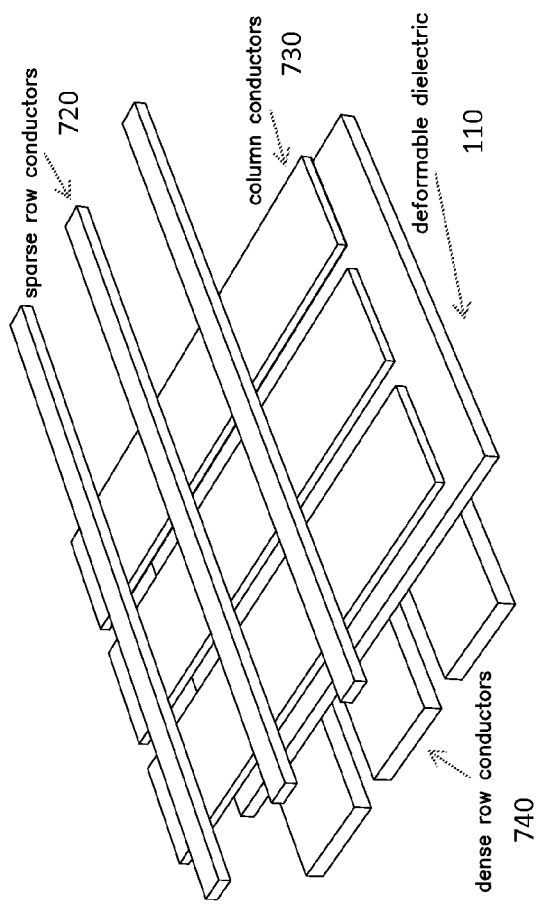
FIG. 7 depicts a diagram of a hybrid touch sensor.

In FIG. 7, the hybrid touch sensor 700 has sparsely-spaced, narrow row conductors 720 on top of wide column conductors 730. The column conductors 730 are positioned on a deformable dielectric 110, and the deformable dielectric 110 is positioned on row conductors 740.

The implementation of FIG. 7 shows an example of implementation that stacks a force-sensitive sensor on top of a true capacitive touch sensor. The true capacitive sensor part of FIG. 7 includes the narrow row conductors 720 that are widely-spaced from each other, which are atop of wide column conductors 730. The force-sensitive sensor part of FIG. 7 has the wide column conductors 730 positioned atop of the deformable dielectric 110, which is positioned on the wide row conductors 740, for which the wide row conductors 740 are dense. The force-sensitive sensor part of the hybrid touch sensor 700 can be used to measure the force between the wide column conductors 730 and the row conductors 740, and the true capacitive touch sensor part of the hybrid touch sensor 700 can be used to measure the fringing fields between the row conductors 720 and the wide column conductors 730. The wide column conductors 730 are shared between the force-sensitive sensor and the true capacitive touch sensor. There can be two separate measurements at each intersection of the respective row conductors 720, 740 and column conductors 730, for the force-sensitive sensor and the true capacitive touch sensor parts of the hybrid touch sensor 700.

In some implementations, the hybrid touch sensor 700 is a stack of dense row conductors 740 on the bottom, then a compressible, deformable dielectric 110 on top of the row conductors 740, then dense column conductors 730 on top of the dielectric 110, and then sparse row conductors 720 on top of the column conductors 730. The column conductors 730 are positioned between the row conductors 720 and the deformable dielectric 100, and the deformable dielectric 100 is positioned between the column conductors 730 and the row conductors 740. In terms of the perspective illustrated in FIG. 7, the row conductors 720 are considered to be on top of the other layers shown for the sensor, and the row conductors 740 are considered to be underneath the other layers shown for the sensor. By measuring the parallel-plate capacitance from the dense rows to the dense columns, a force measurement can be obtained, and by measuring the fringing capacitance from the dense columns to the sparse rows, a true capacitive touch signal can be obtained, where the user's touch can result in an increase in measured capacitance in the force measurement and a decrease in measured capacitance in the true capacitive touch measurement.

Various implementations described above may be formed of one or more of the materials or techniques described below. For example, the dielectric may be deformable, and may be, for example, a soft plastic material, soft silicone, an elastomer, or another material that has an ability to resume its shape when a deforming force is removed. The soft plastic material may be pushed out from the sides when it is depressed in an area. These materials, while soft, may not be particularly compressible (e.g., their volume may not change significantly with applied pressure). This may mean that any decrease in separation between the plates can result from a displacement of the volume of the dielectric, and not an actual decrease in that volume. This may result in the formation of a ring shape around the depressed area, for example. This "waterbed effect" can mean that any region of decreased separation may be offset by a region of increased separation, to provide a volume for the displaced material. For example, when the volume may be preserved when the dielectric is pressed, the depressed area can have a decreased dielectric thickness (e.g., decreased separation between the row and column conductors), and the areas around the depressed area can have an increased dielectric thickness (e.g., increased separation between the row and column conductors). Some other implementations may have the areas of increased or decreased capacitances reversed, depending on the area and properties. In some implementations, software may be used to determine the true capacitive touch, and the software may also look at the depressed areas with the ring shapes of dielectric material around it to determine the force.

In some implementations, the ring shape of increased capacitance around the point of decreased capacitance can be used to distinguish a signal that results from force from a signal that results from true capacitive touch. For some of these implementations, the sensor can be an m*n (capacitance from a row to a column) capacitive force-sensitive sensor with an incompressible deformable dielectric.

In other implementations, dielectric materials may be used that change in volume as they are depressed (e.g., foam comprising mostly air or another compressible gas, with the rest of the foam made from a flexible material). Other implementations may use spacer dots. The air in the air gaps can be used as the deformable dielectric, and the touch force may be limited by the rigidity of the sensor rather than the rigidity of the dielectric. The air gap is also optically transparent, and the air in the air gap is compressible. The spacer dots with the air gaps may be similar to those used in resistive touch screens, for example. Since the air can be highly compressible, the touch sensors employing the space dots can sense a very light force, limited only by the rigidity of the sensor layers.

In some implementations, the ground plane can be a sheet of ITO or other transparent conductor. For example, the touch sensor of FIG. 4 can have the ground plane as a sheet of ITO that can be connected to a circuit ground. The ground plane may not be patterned in some implementations, so that the resistance between two points in the ground plane, for a given sheet resistance, can be smaller than if the sheet were patterned in the manner of the rows and columns. Such ground planes may be used in other (rigid and not force-sensitive) systems, in order to shield the touch sensor from electrical noise generated by a liquid crystal display (LCD). If the touch sensor is used in front of LCD, then it is also possible to use the LCD itself as the ground plane. For example, in some implementations, in order to avoid adding another layer (e.g., a ground layer) to the stack of the touch sensor, the LCD itself can be used as the ground plane, which may include aluminum or other metal wires over the surface of the display that can be modeled as a ground plane. If the LCD and touch sensor share a circuit ground, then traces on the LCD may be considered to be at ground. The LCD traces may be driven at some voltage having both a DC component and an AC component, where the DC component may not be taken into consideration because the coupling to the ground plane is capacitive. The AC component may be important at least because it may introduce noise into the received signal. For example, the AC component of the signal on the metal wires may couple into the receiver, although it can be rejected with some noise reduction techniques. For instance, noise reduction techniques may be employed to reduce the effects of the coupled noise, such as described in U.S. patent application Ser. Nos. 12/838,419 and 12/838,422, both filed on Jul. 16, 2010, and which are both incorporated by reference in their entirety.

In some implementations, the ground plane may be replaced by a sheet of material with a high dielectric constant. For example, if the deformable spacer layer is foam, or air with spacer dots, then plastic materials (e.g., polyester or acrylic) can have a higher dielectric constant. In these variant implementations, the measured capacitance can increase (instead of decreasing) as the fringing field is pushed into the material with high dielectric constant. Since the field may not be shielded by the dielectric sheet, these variant implementations can allow the dielectric sheet to be placed either behind the touch sensor, as in some of the ground plane implementations, or in front of the touch sensor, toward the user.

In some implementations, the capacitances in these systems can be configured to be on the order of about 1 pF in capacitance. Larger capacitances may correspond to higher signal levels, but may also contribute to the RC product of each capacitance under test against the resistance of the row and column conductors. This RC product can be configured such that the system operation is not slow compared to the frequency of the excitation voltage, and the excitation signal will not be attenuated along the conductor traces and produce a large (and spatially varying) error in the measurement. For sensors constructed using ITO, for example, with a sheet resistance around 50 ohms per square, the capacitance can be about ~1 pF. For sensors made from lower-resistance materials, for example, from fine metal wires, a larger capacitance value (larger than ~1 pF) can be optimally utilized.

When the force-dependent capacitance is a parallel plate capacitance, as in the touch sensors of FIG. 1, 2 or 7, the value of the capacitance can be approximated by $C = \text{epsilon} * A/d$, where A is the area of the capacitor (slightly less than the matrix pitch squared), d is the separation between the row and column conductors, and epsilon is the dielectric material's permittivity. The value of the capacitance C can therefore be determined as a function of the thickness of the deformable dielectric material. The matrix can have a pitch around 5 mm, for example, which corresponds to the approximate size of a finger contact. This can mean that a separation between 0.1 mm and 1 mm may produce the capacitance of ~1 pF. A more accurate estimate of the capacitance value may depend on the pitch of the matrix, which determines the area of the plates, and on the relative dielectric constant of the deformable material, which may be very close to one for air with spacer dots, or three to four for elastomers.

When the force-dependent capacitance is a fringing capacitance, as described with respect to FIG. 4, for example, there may be other ways to approximate the capacitance values other than a simple closed-form expression to approximate that capacitance value. The in-plane distance between the row and column conductors can determine the distance normal to that plane by which the field extends. For example, for a grid of fine wires spaced 2 mm apart, a significant fraction of the field may extend out by around ~2 mm. This can mean that, as the sensor layers move closer to that ground plane, the ground plane can begin to affect the capacitance significantly around a distance of 2 mm. The thickness of the deformable dielectric can therefore be configured to be on that order (e.g., between around 0.2 mm and 2 mm).

The touch sensor may be made on any number of flexible, non-conducting substrates. One such material includes a polyester (PET) sheet. For example, the touch sensor can be made from a top sheet, with the row conductors, laminated to a bottom sheet, with the column conductors. In some implementations, the two sheets could be laminated using transparent pressure-sensitive adhesive (for example, the "Optically Clear Adhesive" (OCA) product from 3M™ of St. Paul, Minn.), or using a liquid ultraviolet (UV)-cure adhesive. In some implementations, the conductive row and column conductors may be formed using wide traces of ITO or another transparent conductive material. In some implementations, because the resistivity of these materials may be high, in order to achieve an acceptable resistance, the traces can be configured to be wide, on the order of at least ~1 mm. The separation between the row and column conductors can be selected so that the parallel plate capacitance where the traces overlap does not become too large, and limit the excitation frequency by increasing the RC product of the lines. In practice, this may correspond to a separation of around ~0.1 mm, for example.

In some implementations, the row and column conductors may also be formed using opaque metal wires that are narrow enough (~10 um) to be inconspicuous. In that case, the parallel plate component of the capacitance may be negligible, and the two sheets may be placed as close together as mechanically practical. When the row and column conductors are made from narrow metal wires, a pattern can be configured where the row and column conductors cross over each other more than once for each point in the matrix. For example, each row and each column conductor can have three separate wires, which are all connected together electrically. This can mean, for example, that for each point in the matrix, the wires can cross over each other 3*3=9 times. This can have the effect of increasing the total capacitance, and decreasing the distance by which the fringing field extends out of the touch sensor (and thus decreasing the appropriate thickness for the deformable dielectric).

In some implementations, the separation the sensor and the ground plane may be around ~1 mm. The separation of the row and column conductors may be dependent on the geometry of the pattern, and may be, on a first-order approximation, roughly co-planar. In some implementations, the row conductors used for the top layer of the capacitance touch sensor may be formed narrow enough to be around 6 um, such that the parallel plate capacitance at the areas below those narrow row conductors is negligible, and the separation between those narrow row conductors and the underlying column conductor can be made small. If ITO is used, for example, then there may be about ~0.1 mm of separation between the row conductors and the underlying column conductors.

In some implementations, the sparse row conductors can be patterned from a thin film (e.g., around hundreds of nanometers of ITO) on top of a polyester substrate (e.g., around ~0.1 mm in thickness). The columns can be made in a similar manner. The row and column conductors can be laminated to each other with a transparent adhesive.

Implementations are described in this disclosure where the measurement of capacitance is from each row to each column. There may be a circuit configured to perform this type of measurement, where the circuit includes transmitters and receivers on respective columns and rows. In an implementation of this circuit, the columns can be excited with a transmit voltage so that energy flows from the transmitter into the columns, and a receiver can measure the current on the rows so that the energy flows out of the rows and into the receiver. While the designation of one axis as the rows and another as the columns is generally arbitrary, in this implementation the rows generally may be attached to receivers and the columns generally may be attached to the transmitters.

In various implementations, the conductors in the sensor may be configured in a pattern that increases or maximizes the fringing capacitance, which can be interrupted by the user's finger to provide the desired signal, and to minimize any additional capacitance between the row and column (e.g., parallel plate capacitance), which may provide a constant offset. The rows and columns in the matrix can be nearly coplanar, so that while an area of a respective parallel plate capacitor is relatively small, the separation distance is also relatively small, and its capacitance value may be significant. The pattern of electrodes may also be configured in a manner to make the line width as great as possible, for a given pitch, in order to minimize the resistance of the traces, which may be otherwise significant if large-area sensors are employed. The fringing capacitance can be maximized, for example, by designing the pattern so that the resulting fringing capacitance can be made as large as possible. In some implementations of these touch sensors, the undesired parallel-plate capacitance is reduced or minimized by making the conductor traces narrow where they cross over each other, the resistance can be reduced and minimized by making the electrode traces relatively wide in other areas.

Other implementations may have other conductor patterns. In one implementation, for example, one pattern may involve having evenly-spaced straight lines at the same pitch as the electrical matrix, straight lines at a finger pitch in the electrical matrix, with adjacent lines connected together in groups, and interdigitated patterns to increase a perimeter between a given row and column in order to increase the fringing field.

Some of the described embodiments of the subject matter and the operations can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. The data processing apparatus may include the sensor, may be part of the sensor, may be a part of a system with the sensor, may be integrated within the system and/or sensor, may be part of receivers, transmitters, components and/or logic associated with the sensor or the receivers and/or transmitters, or any combination thereof. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

Various apparatuses, devices, and machines for processing data, may be used as a "data processing apparatus," including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be useful.

What is claimed is:

1. A capacitive touch sensor comprising:
a first array of conductors arranged in rows, wherein the conductors in the first array are arranged substantially in parallel with one another;
a second array of conductors arranged in columns, wherein columns of conductors in the second array are arranged substantially in parallel with one another, wherein the conductors in the second array are located underneath the first array of conductors, and wherein columns of conductors in the second array are arranged in a direction that is substantially perpendicular to a direction of rows of conductors in the first array;
a sheet comprising a deformable dielectric material, wherein the sheet is located underneath the second array of conductors, the deformable dielectric material decreasing a separation between the first array of conductors and the second array of conductors in a depressed area when deformed in the depressed area; and
a ground plane sheet located underneath the sheet, wherein the first and second arrays are configured to produce an electric field with electric field lines that extend in a first direction towards a user of the sensor and in a second direction towards the ground plane sheet,
wherein the sensor is configured to measure a capacitive touch and a force,
wherein the ground plane sheet is positioned at least to partially terminate some of the electric field lines extending in the second direction, and
wherein the sensor is configured to detect an interruption in the electric field lines in the first direction.

2. The sensor of claim 1, wherein:
a width of the conductors measured across a single row in the first array is less than a distance of separation between respective conductors measured between adjacent edges of two adjacent rows of the first array, and
a width of the conductors measured across a single column in the second array is less than a distance of separation between respective conductors measured between adjacent edges of two adjacent columns in the second array.

3. The sensor of claim 1, wherein the sensor is configured to detect the interruption of the electric field lines resulting from an object that is placed within a proximity of the sensor within the electric field lines of the first direction.

4. The sensor of claim 3, wherein the object comprises a human body part of the user of the sensor.

5. The sensor of claim 4, wherein the object comprises a finger of the user of the sensor.

6. The sensor of claim 4, wherein the sensor comprises transmitters and receivers, wherein the sensor is configured to:
transmit, with the transmitters, signals at least at two different frequencies on the first or second array of conductors;
receive, with the receivers, the signals at least at the two different frequencies on the other of the first or second array of conductors;
estimate a capacitance value at each of the two different frequencies using the received signals;
determine that the object is the human body part of the user when the estimated capacitance values at the two frequencies differ by a factor of two or more; and
determine that the object is not an object capable of generating a true capacitive touch signal and that an actuation of the sensor is due to measured force when the estimated capacitance values at the two frequencies do not differ by the factor of two or more.

7. The sensor of claim 1, wherein:
the sensor is configured to receive an external force from touching or depressing the sensor,
the sensor is configured to compress at least the conductors in the first and second arrays toward the ground plane sheet upon receiving the external force, and
the sensor is configured to decrease a capacitance of the sensor when the external force is applied to the sensor.

8. The sensor of claim 7, wherein the sensor comprises a capacitance characteristic where a level of measured capacitance decreases monotonically from when an object is placed within proximity of the sensor to when the object touches and depresses the sensor.

9. The sensor of claim 8, wherein the ground plane sheet comprises a sheet of indium tin oxide (ITO) or a transparent conductor.

10. The sensor of claim 1, wherein the ground plane sheet comprises wires or metal formed on a liquid crystal display (LCD).

11. The sensor of claim 1, wherein the sensor is configured such that either one of the ground plane sheet or a second sheet of material is formed underneath the sheet comprising the deformable dielectric material, wherein the second sheet of material has a dielectric constant that is higher than that of the deformable dielectric material.

12. The sensor of claim 1, wherein the sensor is configured such that either the ground plane is formed underneath the sheet comprising the deformable dielectric material or a second sheet of material is formed above the sheet comprising the deformable dielectric material, wherein the second sheet of material comprises a dielectric constant that is higher than the sheet of the deformable dielectric material.

13. The sensor of claim 1, wherein the sensor comprises indium tin oxide (ITO) on a polyester sheet (PET).

14. The sensor of claim 1, wherein the sensor comprises opaque metal traces on a polyester sheet (PET) or a plastic substance.

15. The sensor of claim 1, wherein the conductors comprise a transparent conductive material arranged in a pattern to produce a fringing electric field between the first and second array of conductors.

16. The sensor of claim 15, wherein the rows and columns comprise diamond-shaped patterns at non-intersecting locations of the conductors in the first and second array of conductors.

17. The sensor of claim 1, wherein the conductors in the second array are positioned between the first array of conductors and the deformable dielectric, and wherein the deformable dielectric is positioned between the conductors in the second array and the ground plane sheet.

18. A capacitive touch sensor comprising:
a first array of conductors arranged in rows, wherein rows of conductors in the first array are arranged substantially in parallel with one another, wherein a width of the conductors measured across a single row in the first array is less than a distance of separation between respective conductors measured between adjacent edges of two adjacent rows of the first array;

a second array of conductors arranged in columns, wherein columns of conductors in the second array are arranged substantially in parallel with one another, wherein the conductors in the second array are located underneath the conductors in the first array, wherein columns of conductors in the second array are arranged in a direction that is substantially perpendicular to a direction of rows of conductors in the first array, and wherein a width of the conductors measured across a single column in the second array is greater than a distance of separation between respective conductors measured between adjacent edges of two adjacent columns in the second array;

a sheet comprising a deformable dielectric material, wherein the sheet is located underneath the second array of conductors; and a third array of conductors arranged in rows, wherein rows of conductors in the third array are arranged substantially in parallel with one another, wherein the conductors in the third array are located underneath the sheet, wherein the rows of conductors in the third array are arranged in a direction that is substantially perpendicular to a direction of the columns of conductors in the second array, and wherein a width of the conductors measured across a single row of the third array is greater than a distance of separation between respective conductors measured between adjacent edges of two adjacent rows in the third array.

19. The sensor of claim 18, wherein:
the sensor comprises a force-sensitive sensor and a true capacitive touch sensor,
the true capacitive touch sensor comprises the conductors of the first and second arrays,
the force-sensitive sensor comprises the conductors of the second and third arrays and the sheet comprising the deformable dielectric material,
the force-sensitive sensor is configured for a first measurement of a first capacitance for a parallel-plate capacitance between intersections of the conductors of the second and third arrays, and
the true capacitive touch sensor is configured for a second measurement of a second capacitance related to a fringing electric field between the first and second arrays of conductors.

20. The sensor of claim 19, wherein:
the sensor is configured to detect when an object is within proximity of touching the sensor by the fringing electric field,
the sensor is further configured to detect when an object touches or applies a force to the sensor,
the sensor is configured to decrease a level of the second capacitance as the object moves closer to touching the sensor, and
the sensor is configured to increase a level of the first capacitance as the object touches and applies the force to the sensor.

21. The sensor of claim 18, wherein the sensor comprises indium tin oxide (ITO) on a polyester sheet (PET).

22. The sensor of claim 18, wherein the sensor comprises opaque metal traces on a polyester sheet (PET) or a plastic substance.

23. The sensor of claim 18, wherein the conductors comprise a transparent conductive material arranged in a pattern to produce a fringing electric field between the first and second array of conductors.

24. The sensor of claim 18, wherein the conductors in the second array are positioned between the first array of conductors and the deformable dielectric, and wherein the deformable dielectric is positioned between the conductors in the second array and the third array of conductors.

25. A method for conducting measurements in a capacitive touch sensor, the sensor comprising a first array of conductors arranged in rows, a second array of conductors arranged in columns that are substantially perpendicular to the rows of conductors in the first array, at least one transmitter coupled to the conductors within one of the first or second array of conductors, and at least one receiver coupled to the conductors within the other of the first or second array of conductors, the method comprising:
transmitting, with the at least one transmitter, signals at least at two different frequencies that generate an electric field between at least one of the conductors in the first array and at least one of the conductors in the second array, wherein the first and second arrays are configured to produce a fringing electric field that extends in a direction towards a user of the sensor and to enable detection of an interruption of the electric field resulting from an object that is placed within a proximity of the sensor;
receiving, with the at least one receiver, the signals with at least the two different frequencies;
estimating a capacitance value at each of the two or more different frequencies using the received signals;
determining when the estimated capacitance value at each of the a two or more frequencies differs by a factor of two or more;
computing a difference or ratio between the estimated capacitance values;
comparing the difference or ratio against a threshold; and
determining whether the object is capable of generating a true capacitive touch signal and whether an actuation of the sensor is due to measured force based on results of the comparison of the difference or ratio between the estimated capacitance values at the two or more frequencies with the threshold.

26. The method of claim 25, wherein the method comprises determining that the object is a human body part of a user of the touch sensor when the estimated capacitance values at the two frequencies differ by the factor of two or more.

27. The method of claim 26, wherein the human body part is a finger.

28. The method of claim 25, wherein:
the conductors in the first array are arranged substantially in parallel with one another,
the conductors in the second array are arranged substantially in parallel with one another,
the conductors in the second array are located underneath the conductors in the first array,
a width of the conductors measured across a single row in the first array is less than a distance of separation between respective conductors measured between adjacent edges of two adjacent rows of the first array, and
a width of the conductors measured across a single column in the second array is less than a distance of separation between respective conductors measured between adjacent edges of two adjacent columns in the second array.

29. The method of claim 28, the sensor further comprising:
a sheet comprising a deformable dielectric material, wherein the sheet is located underneath the second array of conductors; and
a ground plane located underneath the sheet.

30. The method of claim 25, wherein the two different frequencies differ by a ratio of approximately four to one.

31. The method of claim 25, wherein the sensor comprises a true capacitive touch sensor.

32. The method of claim 25, wherein:
the sensor comprises a force-sensitive sensor and a true capacitive touch sensor,
the true capacitive touch sensor comprises conductors in the first and second arrays, and
the force-sensitive sensor comprises the conductors in the second array, conductors in a third array and a sheet comprising a deformable dielectric material.

33. The method of claim 32, wherein:
the conductors in the first array are arranged substantially in parallel with one another,
a width of the conductors measured across a single row in the first array is less than a distance of separation between respective conductors measured between adjacent edges of two adjacent rows of the first array;
the conductors in the second array are arranged substantially in parallel with one another,
the conductors in the second array are located underneath the conductors of the first array,
a width of the conductors measured across a single column in the second array is greater than a distance of separation between respective conductors in the columns measured between adjacent edges of two adjacent columns second array;
the sheet is located underneath the conductors of the second array;
the conductors of the third array are arranged in rows,
the conductors in the third array are arranged substantially in parallel with one another,
the conductors in the third array are located underneath the sheet,
the conductors in the third array are arranged in a direction that is substantially perpendicular to a direction of conductors in the second array, and
a width of the conductors measured across a single row in the third array is greater than a distance of separation between respective conductors measured between adjacent edges of two adjacent rows in the third array.

34. The method of claim 25, wherein:
the two different frequencies comprise a first frequency and a second frequency, and
the first frequency is higher than the second frequency, and
the method further comprises receiving signals for the second frequency at the at least one receiver that have a higher current than signals received for the first frequency.

35. The method of claim 25, wherein the sensor comprises indium tin oxide (ITO) on a polyester sheet (PET).

36. The method of claim 25, wherein the sensor comprises opaque metal traces on a polyester sheet (PET) or a plastic substance.

37. The method of claim 25, wherein the conductors comprise a transparent conductive material arranged in a pattern to produce a fringing electric field between the first and second arrays.

38. The method of claim 37, wherein the rows and columns comprise diamond-shaped patterns at non-intersecting locations of the conductors of the first and second arrays.

* * * * *